United States Patent [19]
Puffenberger et al.

[11] Patent Number: 6,136,259
[45] Date of Patent: Oct. 24, 2000

[54] VEHICLE LOAD FLOOR AND METHOD OF MAKING SAME

[75] Inventors: John P. Puffenberger, Bloomdale; Arthur C. Hagen, Woodville, both of Ohio

[73] Assignee: Lear Corporation, Southfield, Mich.

[21] Appl. No.: 09/111,913

[22] Filed: Jul. 8, 1998

(Under 37 CFR 1.47)

Related U.S. Application Data

[63] Continuation-in-part of application No. 08/606,051, Feb. 23, 1996.

[51] Int. Cl.⁷ .................................................. B29C 49/20
[52] U.S. Cl. ...................... 264/515; 264/516; 264/573; 264/DIG. 50; 296/37.3; 296/901
[58] Field of Search ..................................... 264/515, 516, 264/257, 258, 573, DIG. 50; 156/72, 148, 181; 425/503, 522; 296/37.2, 37.3, 65.1, 66, 68, 901

[56] References Cited

U.S. PATENT DOCUMENTS

| | | |
|---|---|---|
| 3,746,387 | 7/1973 | Schwenk ................................ 296/901 |
| 4,142,757 | 3/1979 | Fogle, Jr. et al. . |
| 4,246,734 | 1/1981 | Fogle, Jr. et al. . |
| 4,778,709 | 10/1988 | Abe et al. ............................... 296/901 |
| 5,056,858 | 10/1991 | Tanaka .................................. 296/37.3 |
| 5,061,002 | 10/1991 | Saso ...................................... 296/37.3 |
| 5,073,318 | 12/1991 | Rohrlach et al. . |
| 5,091,031 | 2/1992 | Strapazzini . |
| 5,129,700 | 7/1992 | Trevisan et al. ........................ 296/901 |
| 5,162,092 | 11/1992 | Klobucar et al. . |
| 5,178,434 | 1/1993 | Krebs ..................................... 296/37.3 |
| 5,194,305 | 3/1993 | Shirahata et al. ....................... 264/515 |
| 5,575,533 | 11/1996 | Glance . |

*Primary Examiner*—Mathieu D. Vargot
*Attorney, Agent, or Firm*—Brooks & Kushman P.C.

[57] ABSTRACT

A method for joining carpet and plastic. The method includes positioning the carpet between a pair of mold halves, extruding a hollow, substantially tubular plastic between the mold halves, blowing air into an open end of the tubular plastic, bringing the mold halves toward each other, and blowing air through needle holes in one of the mold halves to force the plastic against the mold and the carpet. An apparatus for practicing this method, and a product made by the method, are also included.

3 Claims, 11 Drawing Sheets

VEHICLE LOAD FLOOR AND METHOD OF MAKING SAME

CROSS-REFERENCE TO RELATED APPLICATION

This application is a continuation-in-part of U.S. application Ser. No. 08/606,051, filed Feb. 23, 1996 entitled "Method and Apparatus for Joining Carpet and Plastic".

TECHNICAL FIELD

This invention relates to a method and apparatus for joining carpet and plastic, and more particularly to a method and apparatus for joining carpet and plastic by blow molding to form a vehicle load floor.

BACKGROUND ART

A conventional method of attaching carpet to a plastic component in automotive applications is by means of an adhesive. U.S. Pat. No. 5,073,318 to Rohrlach et al., for example, shows a fabric panel and a carpet that are adhered to an inner motor vehicle door panel. A number of difficulties arise from this method.

For instance, the component must first be produced and then transported to a separate work area for application of the adhesive. There, the adhesive must be applied to either the carpet or the component, and the component and carpet brought together for some period of time. Not only does each of these steps involve significant labor and material costs, but they are relatively inexact processes as well.

Several methods have been proposed for directly bonding carpet and plastic. U.S. Pat. No. 5,091,031 to Strapazzini shows a method for injection molding plastic panels with inserts which are useful as automotive interior trim panels and interior door panels. Similarly, U.S. Pat. No. 5,162,092 to Klobucar et al. shows a process for gas-assisted injection molding a thermoplastic backing or other synthetic resin to a carpet layer.

Typically, vehicle load floors include substantial structural reinforcement, such as metal bars or tubes, to meet the load requirements. Such structure is typically very heavy, and manufacturing costs and complexity are high, therefore improvements are desirable.

SUMMARY OF THE INVENTION

The present invention is a method and apparatus for joining carpet and plastic. The method comprises positioning the carpet between a pair of mold halves, introducing plastic between the mold halves, bringing the mold halves toward each other, and blowing fluid through at least one needle hole in one of the mold halves to force the plastic against the mold and the carpet.

The apparatus comprises a pair of mold halves, an inserter for positioning the carpet between the mold halves, an extruder for introducing plastic between the mold halves, a press for bringing the mold halves toward each other, and a blower for blowing fluid through at least one needle hole in one of the mold halves to force the plastic against the mold and the carpet.

In a preferred embodiment, a vehicle load floor is manufactured in accordance with the above-described method and apparatus. The vehicle load floor comprises a plastic substrate including first and second walls formed together and having an interior cavity formed between the two walls. A carpet is integrally bonded to one of the two plastic walls. The two plastic walls are locally knitted together to form a plurality of spaced apart radially extending support ribs. Preferably, the support ribs are sequentially staggered in distance from the center of the substrate for added structural integrity. Also, a plurality of spaced, curved support portions extend circumferentially with respect to the center. The curved support portions are also formed by locally knitting the two plastic walls together. A method of forming a carpeted vehicle load floor with such structure is also described.

Accordingly, it is an object of the present invention to provide a method of the type described above in which the component is formed and joined to the carpet at the same location.

Another object of the present invention is to provide a method of the type described above which eliminates the need for a separate adhesive.

Another object of the present invention is to provide an apparatus of the type described above for forming the component and carpet assembly at the same location.

Still another object of the present invention is to provide an article produced by the method or the apparatus of the type described above, particularly a load floor which is sufficiently strong for use in the interior of an automobile without requiring metal reinforcement.

These and other objects, features, and advantages of the present invention are readily apparent from the following detailed description of the best mode for carrying out the invention when taken in conjunction with the accompanying drawings.

BEST MODE FOR CARRYING OUT THE INVENTION

With reference to the drawings, the preferred embodiments of the present invention will be described.

Figure 1:
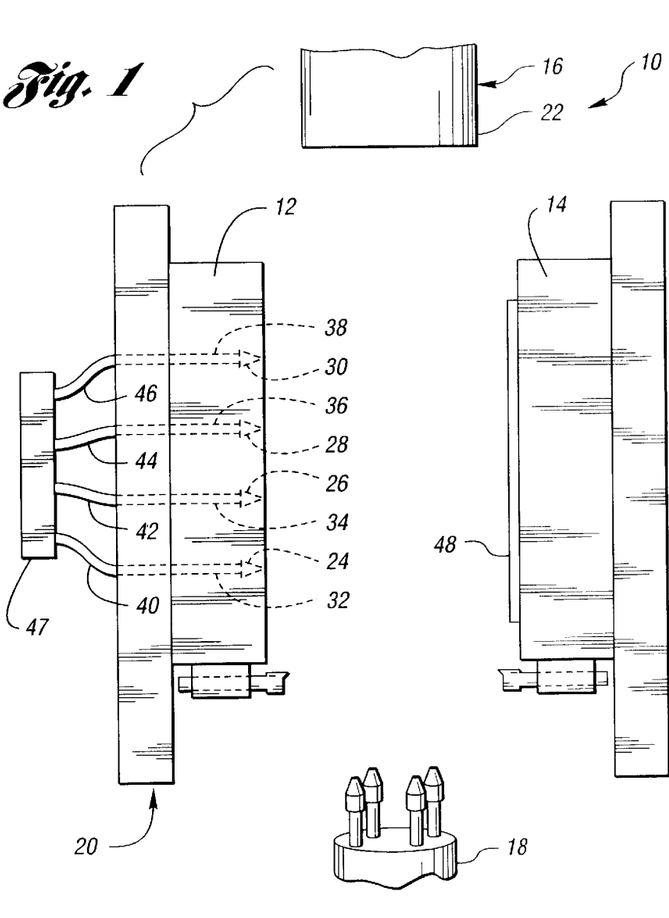
FIG. 1 is a front view of an apparatus according to the present invention for joining carpet and plastic.
Figure 2:
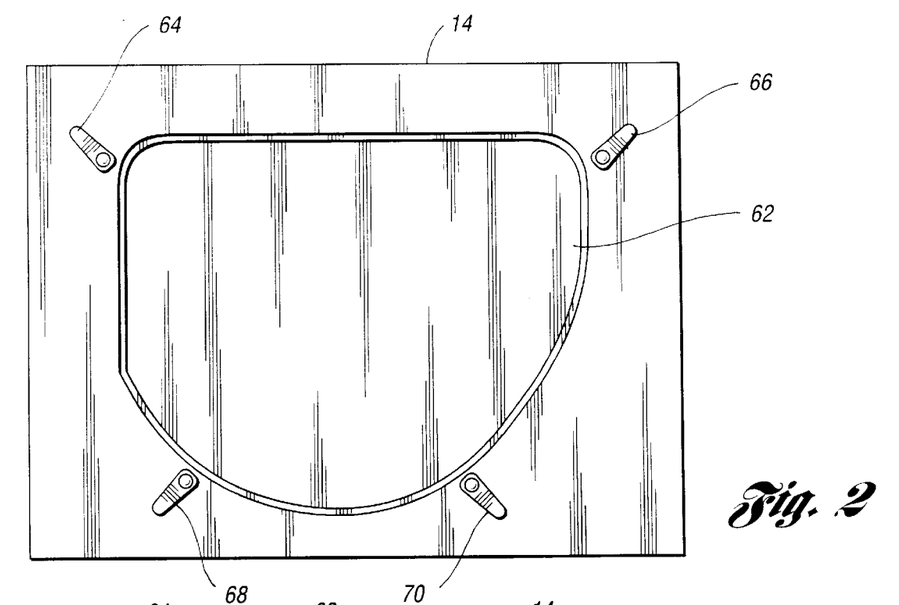
FIG. 2 is a side view of a mold half of the apparatus in an initial state.

FIG. 1 shows an extrusion blow molding press 10 according to the present invention for joining carpet and plastic. The apparatus 10 comprises a pair of mold halves 12 and 14, an extruder 16, a first or bottom blower 18, and a press 20. The apparatus 10 is preferably set up with an intermittent extruder, with an accumulator ram or reciprocating screw and a side fed die head.

An accumulator 22 having a conventional mandrel and bushing assembly is situated generally above the mold halves 12 and 14. The mold halves 12 and 14 are mounted on conventional platen and piston assemblies (not shown), and one of the mold halves 12 has a series of four needle holes 24, 26, 28 and 30. The needle holes are connected, respectively, to passageways 32, 34, 36 and 38, and to hoses 40, 42, 44 and 46. The hoses, in turn, are connected to a source 47 of pressurized fluid such as air. A piece of backingless carpet 48 is situated adjacent the mold half 14.

Figure 3:
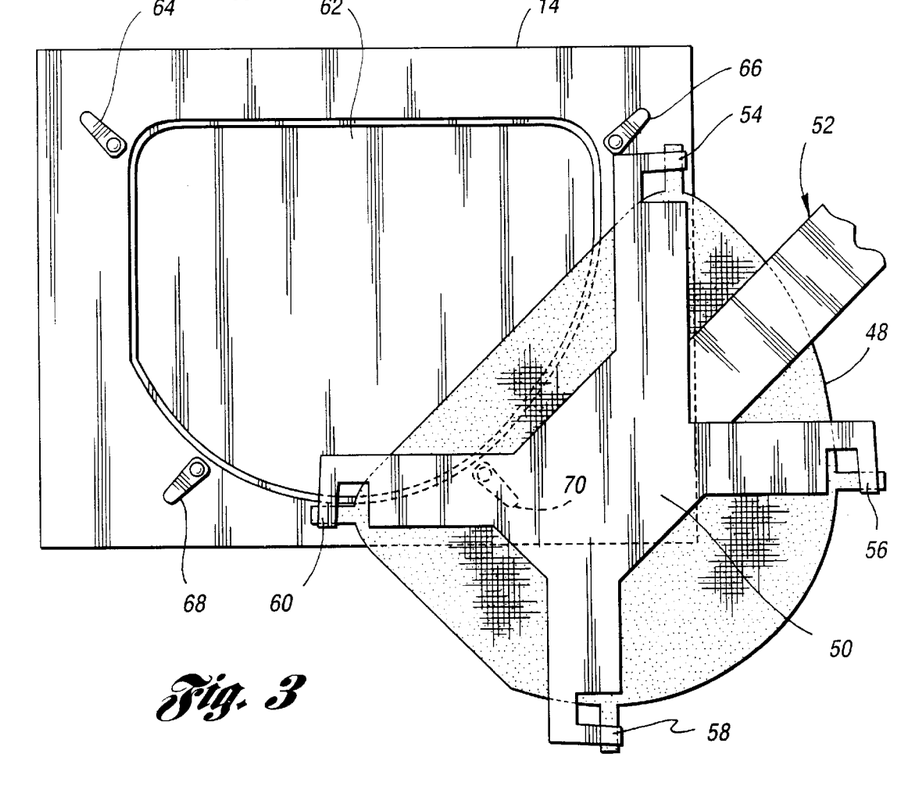
FIG. 3 is a side view of the mold half showing an inserter bringing carpet into the mold.
Figure 4:
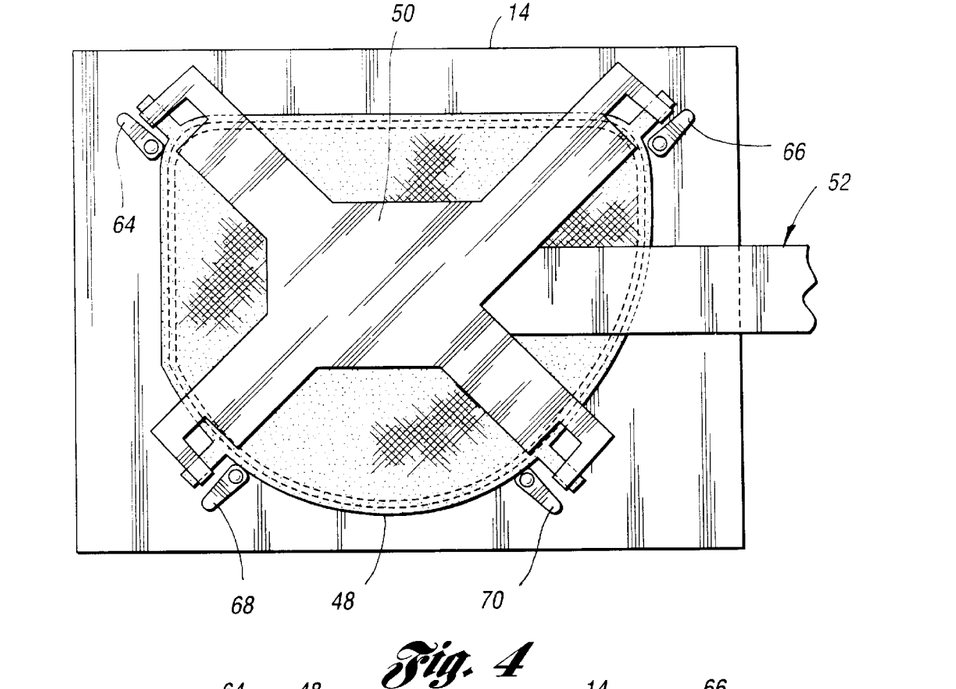
FIG. 4 is a side view of the mold half with the inserter in a fully extended position.

The carpet 48 is mounted on the mold half 14 as shown in FIGS. 2 through 7. An arm 50 of a carpet inserting device 52 has the carpet 48 attached thereto at four tabs 54, 56, 58 and 60, preferably with metal hook-and-loop type fasteners. As shown in FIGS. 3 and 4, a part forming cycle is initiated when the arm 50 positions the carpet 48 in the press between the mold halves and proximate a cavity 62 in the mold half 14.

Figure 5:
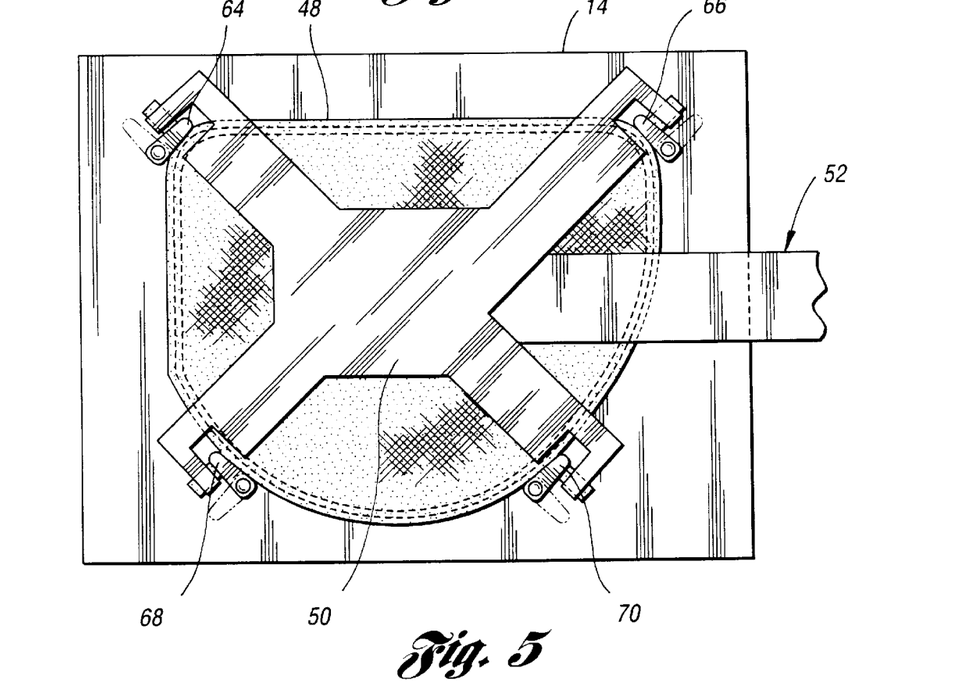
FIG. 5 is a side view of the mold half showing the path of clamps for securing the carpet.
Figure 6:
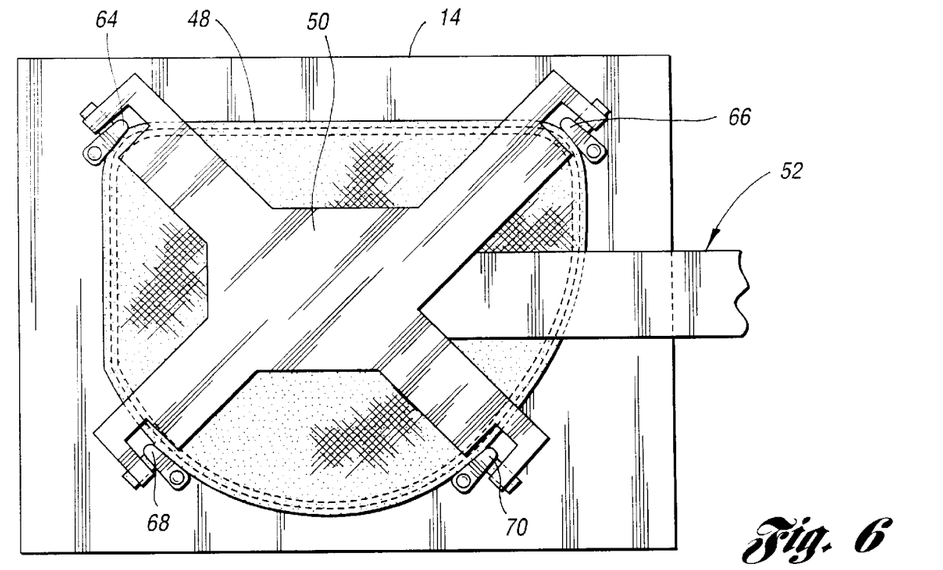
FIG. 6 is a side view of the mold half showing the clamps securing the carpet.

After the carpet 48 is positioned as shown in FIG. 4, clamps 64, 66, 68 and 70 move to secure the carpet to the mold half 14. As shown in FIG. 5, the two clamps 64 and 68 on the left side of the mold extend from their recessed positions, and rotate clockwise 90 degrees as shown in phantom. Similarly, the two clamps 66 and 70 on the right side of the mold extend from their recessed positions and rotate counterclockwise 90 degrees. As the clamps rotate, they retract back toward the surface of the mold half 14, trapping the tabs of the carpet 48 against the mold as shown in FIG. 6.

Figure 7:
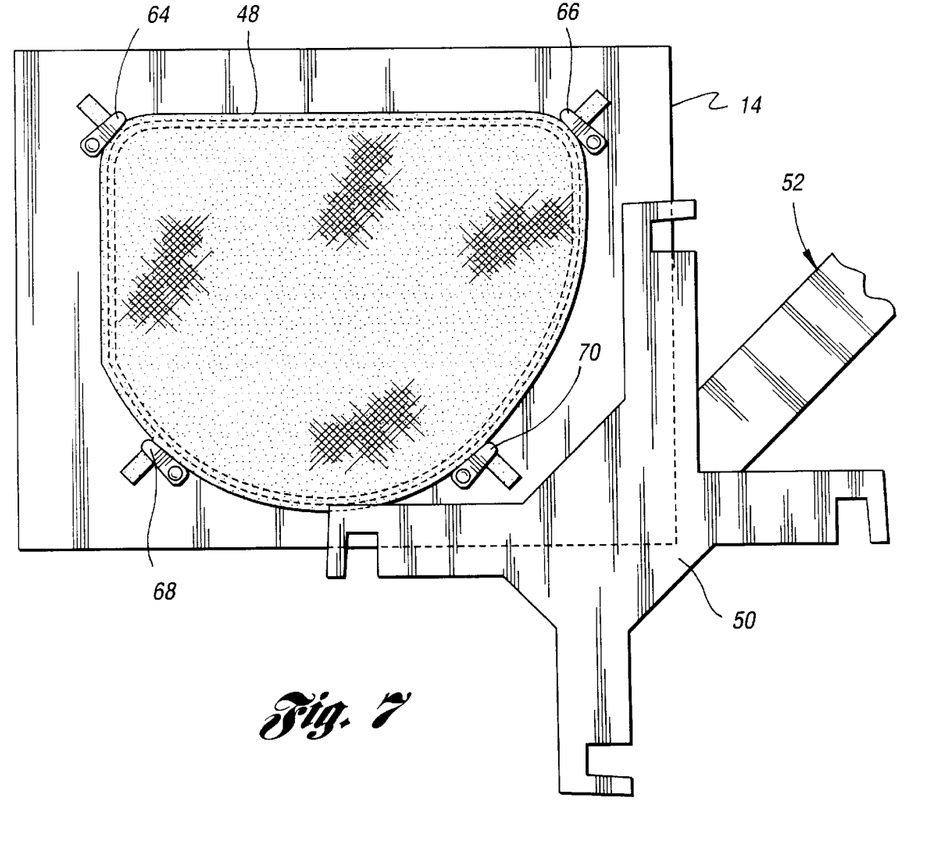
FIG. 7 is a side view of the mold half showing the inserter withdrawing from the mold.
Figure 8:
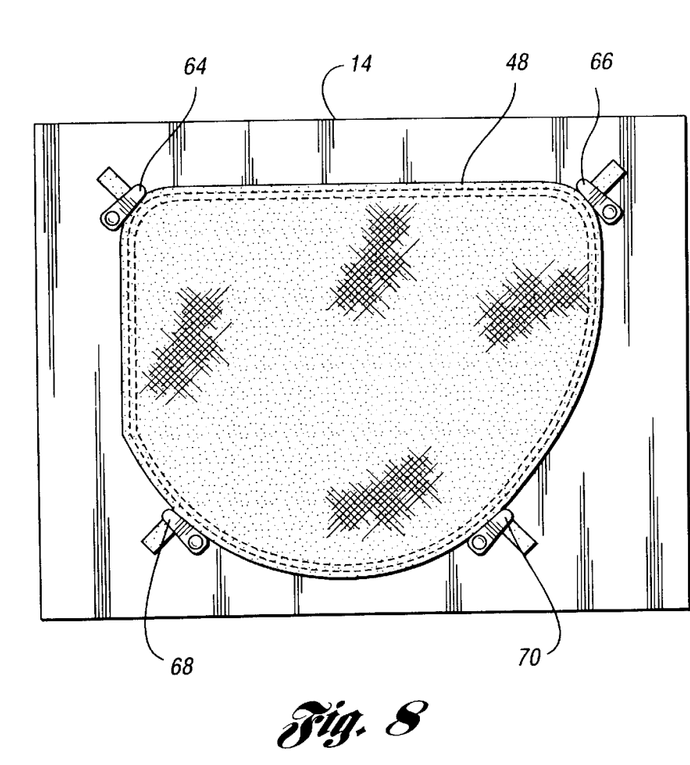
FIG. 8 is a side view of the mold half showing the inserter fully withdrawn from the mold.

The arm 50 of the inserter 52 then retracts from the mold half 14, leaving the carpet 48 adjacent the surface of the mold half and held by the clamps 64, 66, 68 and 70. FIG. 7 shows the arm 50 of the carpet inserter 52 moving out of the press, leaving the carpet in place on the mold half 14 as shown in FIG. 8. At this point, the press is ready to run a molding cycle.

Figure 9:
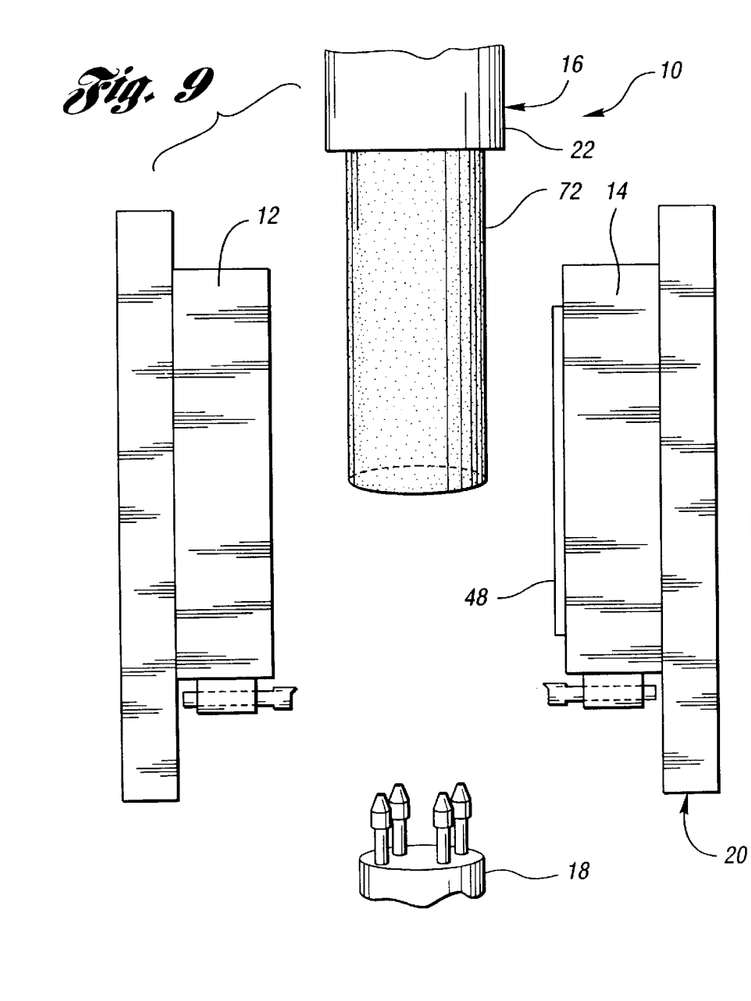
FIG. 9 is a front view of the apparatus with the carpet in position.
Figure 10:
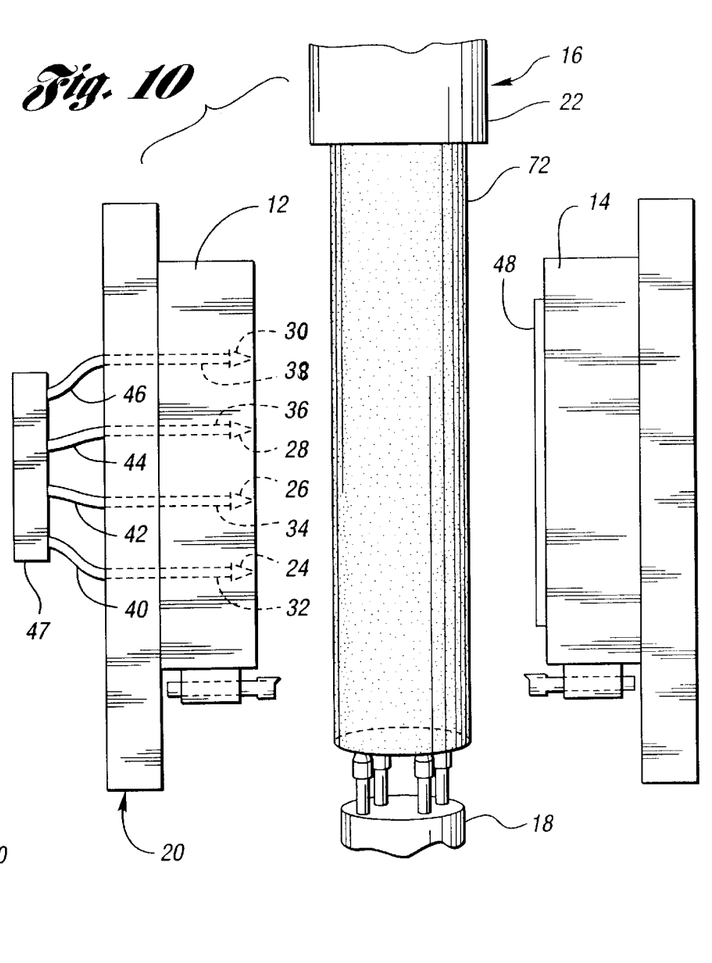
FIG. 10 is a front view of the apparatus showing a parison in a fully extended position.

FIGS. 9 through 13 show the molding cycle. As shown in FIGS. 9 and 10, a hollow, substantially tubular molten plastic or parison 72 is extruded from the accumulator 22. The parison 72 is introduced into the space between the mold halves 12 and 14, preferably until the bottom of the parison approaches the outlets of the blower 18. To inhibit deformation of the parison, the blower 18 blows a fluid, preferably air, into the open bottom end of the parison to maintain positive, i.e. greater than ambient, pressure inside the parison. To further inhibit deformation, air may be introduced into the top end of the parison 72 through the accumulator 22. In a preferred embodiment, air is introduced from the bottom through the blower 18 at about 50 pounds per square inch.

Figure 11:
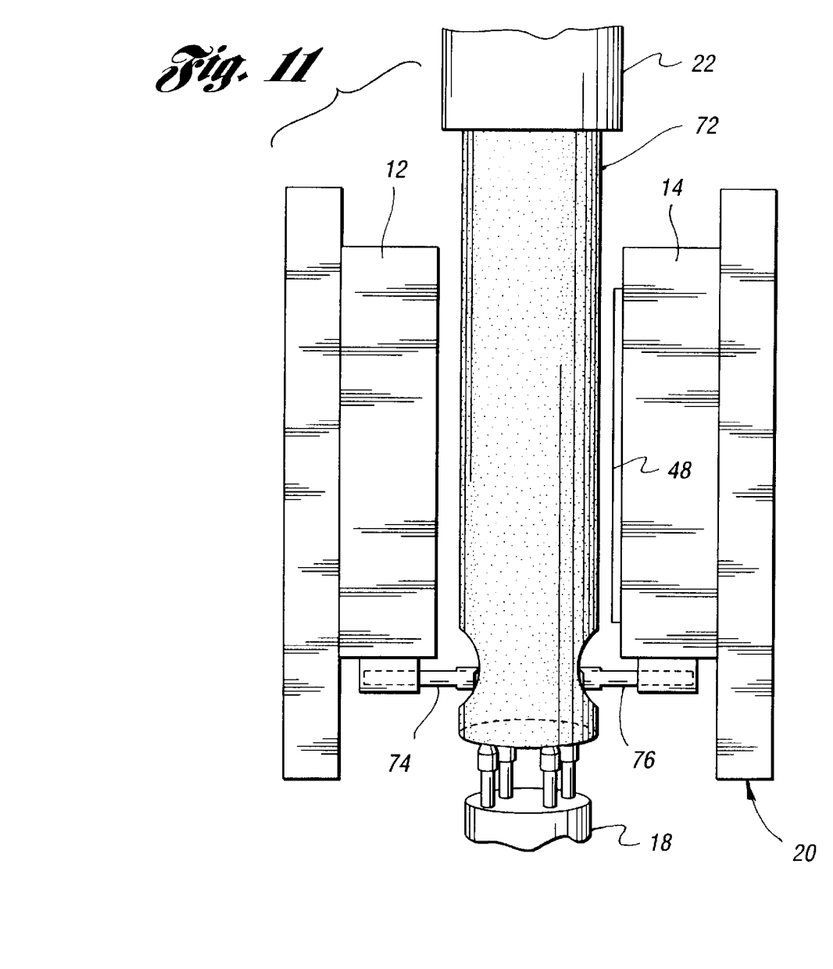
FIG. 11 is a front view of the apparatus showing a pair of mold halves beginning to close.
Figure 12:
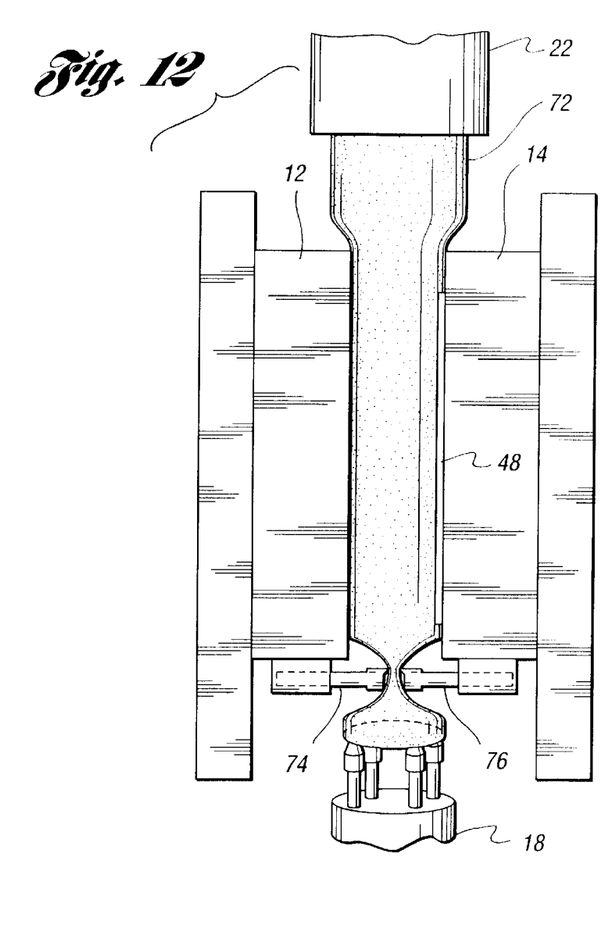
FIG. 12 is a front view of the apparatus showing the mold halves beginning to engage the parison.

After the parison is fully extruded, the press brings the mold halves 12 and 14 toward each other as shown in FIGS. 11 and 12. As the mold halves 12 and 14 are brought closer together, pinch bars 74 and 76 extend and neck the bottom of the parison 72. At the same time, the parison engages the carpet 48.

Figure 13:
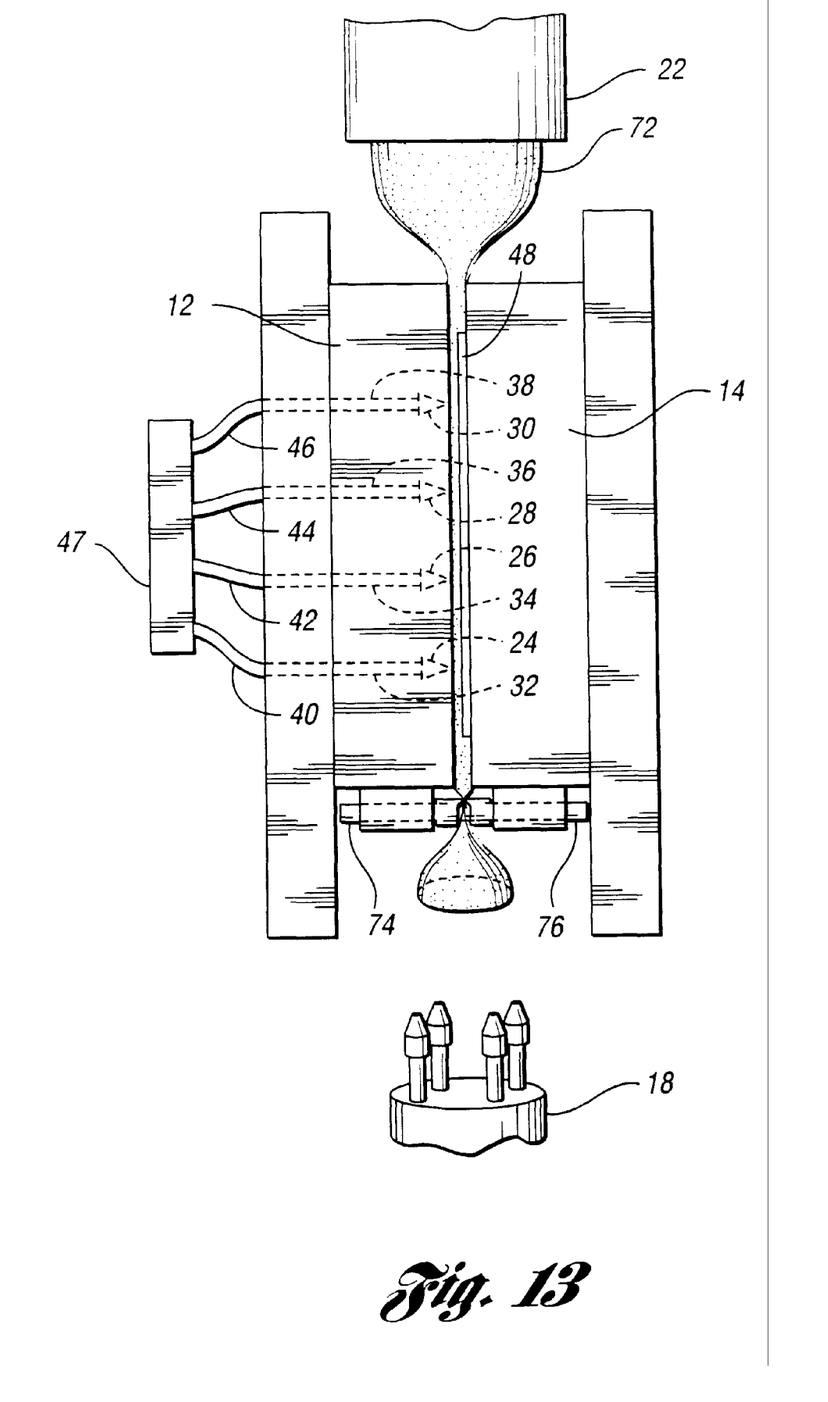
FIG. 13 is a front view of the apparatus showing the mold halves fully closed.

FIG. 13 shows the mold halves 12 and 14 fully closed. The source 47 of pressurized air then blows air at about 100 psi through the hoses 40, 42, 44 and 46 into the passages 32, 34, 36 and 38, respectively. In turn, the pressurized air is forced through the needle holes 24, 26, 28 and 30 to force the plastic against the mold half 12 and against the carpet 48 and the mold half 14.

Figure 14:
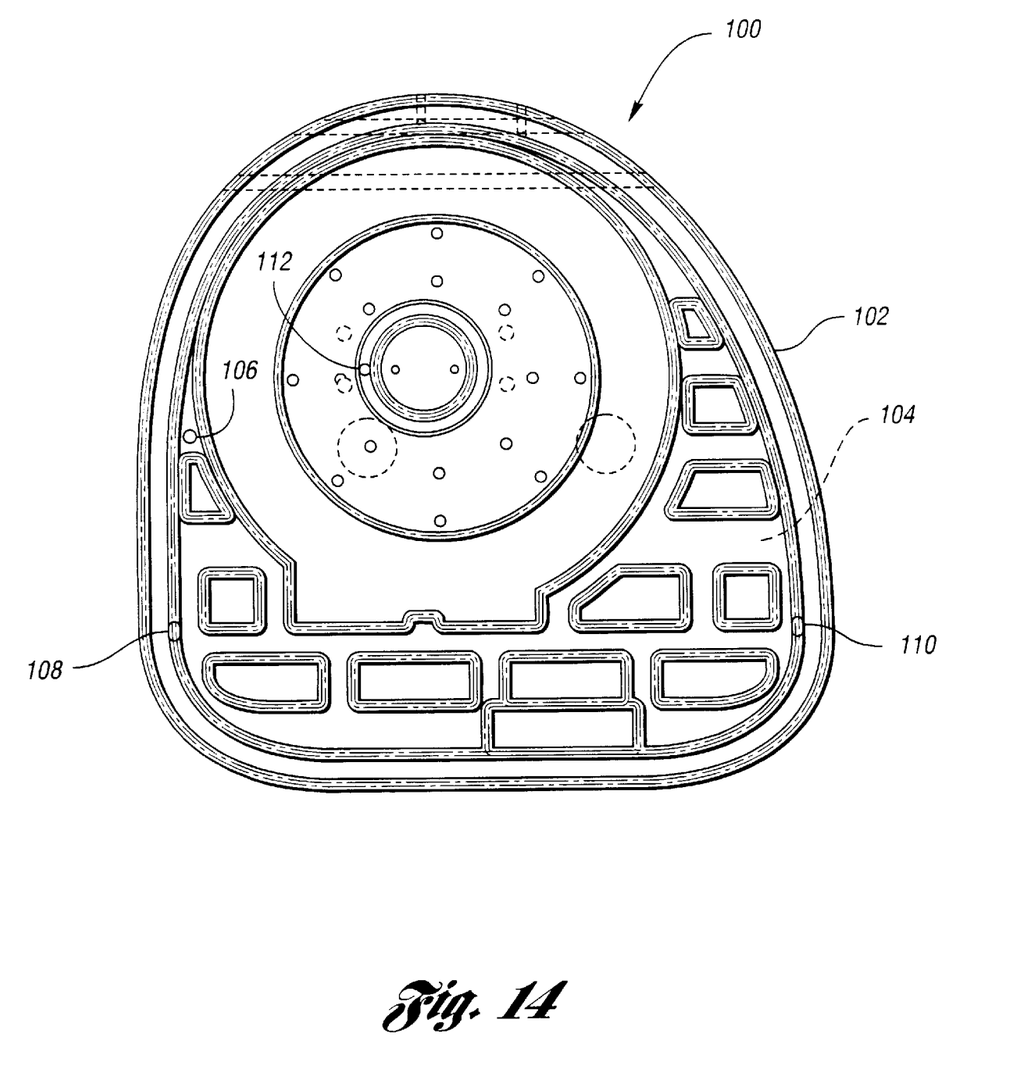
FIG. 14 is a top view of a spare tire cover according to the present invention for a motor vehicle.
Figure 15:
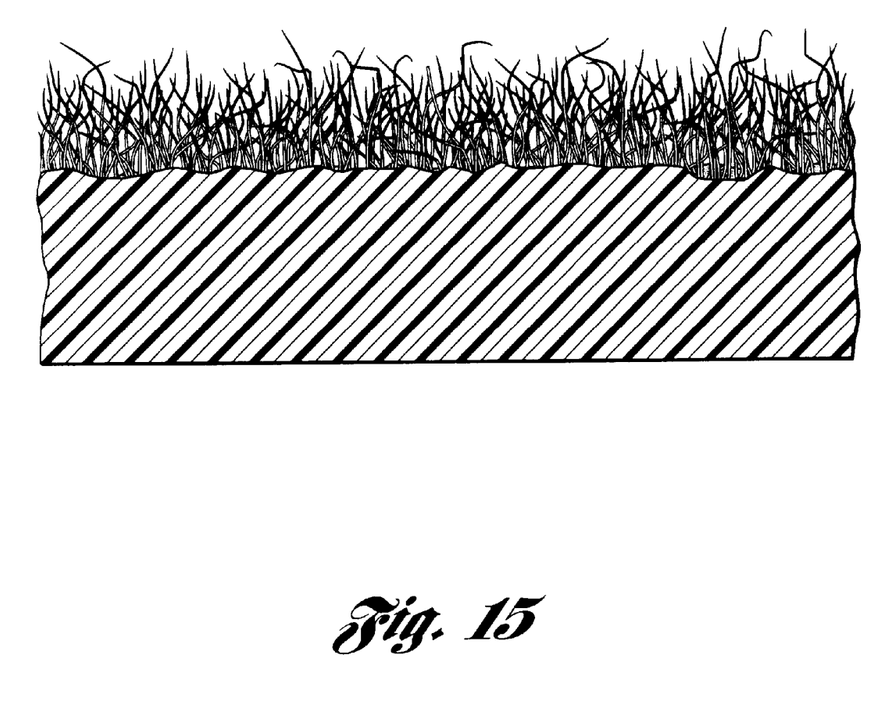
FIG. 15 is a cross-sectional view of a wall of the spare tire cover.

FIGS. 14 and 15 show an automobile spare tire cover 100 manufactured according to the present invention. The spare tire cover 100 comprises a plastic substrate 102 having an interior cavity 104, and the backingless, non-woven carpet 48 integrally bonded to the substrate. The spare tire cover 100 has a maximum width of about 3 feet, and a maximum height of about 3 feet. The part can be trimmed at the press, cooled, and packaged for shipment without any additional processing. In a resultant part manufactured according to the present invention, such as the spare tire cover 100, the fibers of the carpet 48 are permanently embedded in the wall of the part. To make the spare tire cover 100, which has a finished average thickness of about 0.10 inch, a parison 72 having a diameter of about 18 inches and an average wall thickness of about ¼ of an inch can be used. The parison is preferably slightly thicker at its bottom or open end, with a programmed extrusion with a 100 step profile.

For the spare tire cover 100, a blow molding grade thermoplastic such as Montel 7823 polypropylene can be used with a polyester 7 ounce traditional carpet sold by Gates Manufacturing under the designation WT2ZX. The molding takes place at about 450 degrees F., with about a 30 second positive pressure applied through needle holes 106, 108, 110 and 112. The mold halves can be water cooled, and ambient or chilled air circulated through one or more of the needle holes 106, 108, 110 and 112. One or more of the needle holes, such as needle holes 108 and 110, are provided as exits for the circulating air. This process cools the inside of the part, particularly that portion of the part next to the carpet, which may act as a partial insulator. For the spare tire cover, a 100 ton press is preferred.

In certain situations, it is desirable to continue the carpeting beyond the peripheral edge of the plastic part. In such a situation, one might use a living hinge insert, or similar parting line-type insert. The spacing between the mold halves at the parting line or living hinge area would be only sufficient to allow the carpet to pass therethrough without damage to the carpet. The mold halves would be sufficiently closed to restrict flow of plastic material therethrough. The application of a masking tape to the backing of the carpet can be used to prevent bonding of the plastic to the back of the carpet in such an area. In this manner, the carpet may pass through the parting line area so that the carpet extends beyond the peripheral edge of the plastic part. This masking tape technique may be used in a variety of molding situations to prevent local bonding of the molten plastic to the carpet for various reasons.

The method of the present invention thus results in blow molding the component around the surface fibers of the carpet. Applications of this process include interior door panels, carpeted rear automotive decks, seat bolsters, arm rests, air duct sound deadening, rear seat back panels, toy chairs, and boat decking.

Figure 16:
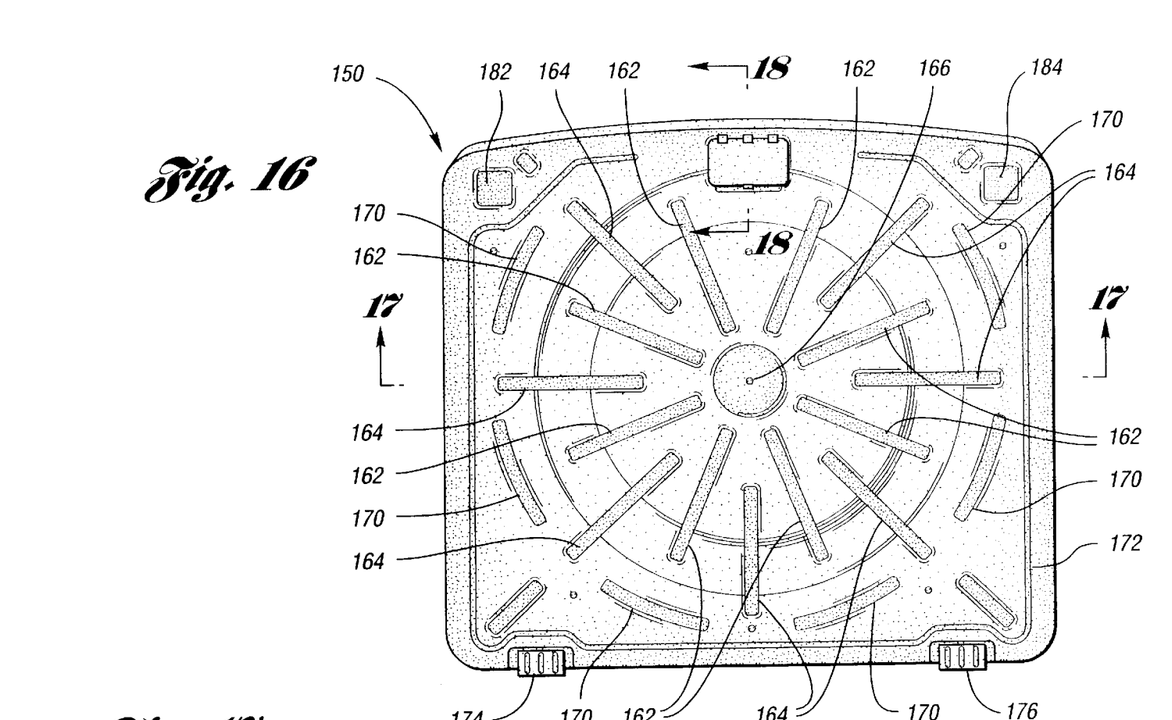
FIG. 16 is a plan view of a vehicle load floor manufactured in accordance with an alternative embodiment of the invention.
Figure 17:
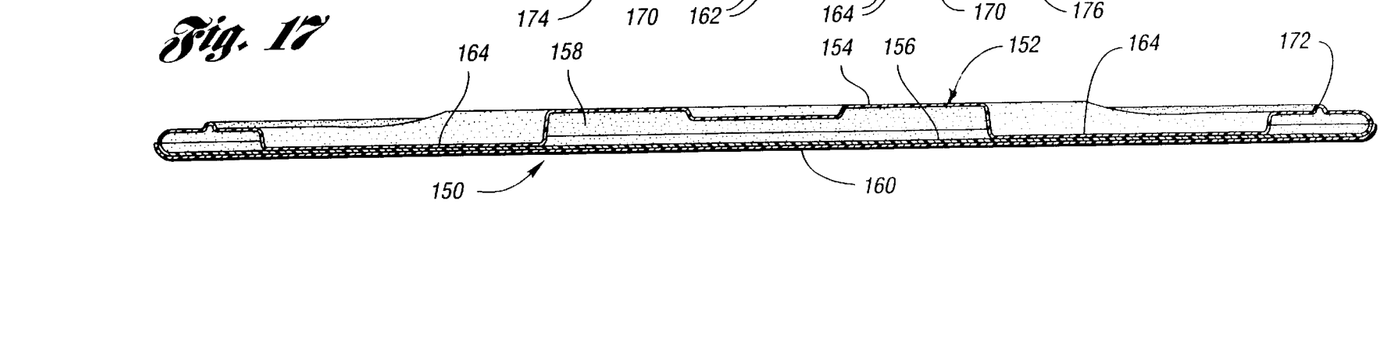
FIG. 17 is a vertical cross-sectional view taken at line 17—17 of FIG. 16.

Referring to FIGS. 16–19, a vehicle load floor 150 is shown in accordance with an alternative embodiment of the invention, and manufactured by the process described above. Referring specifically to FIG. 17, the load floor 150 comprises a plastic substrate 152 including opposing first and second walls 154,156 formed together, and having an interior cavity 158 formed between the two walls 154,156. A backingless carpet 160 is integrally bonded to the second wall 156.

As shown in FIGS. 16 and 17, the two plastic walls 154,156 are locally knitted together to form a plurality of spaced apart radially extending support ribs 162,164.

As shown in FIG. 16, the radially extending support ribs 162,164 are sequentially staggered in distance from the center 166 of the load floor 150. This configuration enhances structural integrity of the load floor 150, and also helps prevent warp of the load floor 150 in manufacturing.

As further illustrated in FIG. 16, the vehicle load floor 150 also includes a plurality of spaced, curved support portions 170 extending circumferentially with respect to the center 166 of the load floor 150. The spaced, curved support portions 170 are also formed by locally knitting the two plastic walls 154,156 together, similar to the formation of the support ribs 162,164 described above. These spaced, curved support portions further contribute to structural integrity for the load floor 150, and also help prevent warp of the load floor 150 in manufacturing.

Vehicle specifications require that such a load floor must support 240 pounds of weight over 100 square inches with not more than 10 millimeters of deflection. The support rib configuration 162, 164, 170 described above in combination with the use of a 30% fiberglass-reinforced polypropylene resin enable the use of the previously described manufacturing techniques in manufacturing a load floor sufficiently strong to meet the static deflection requirements without requiring metal reinforcement.

As shown in FIGS. 16 and 17, a bead 172 extends substantially around the entire periphery of the load floor 150. The bead 162 is operative to form a seal against an adjacent carpet or gasket to acoustically isolate the sheet metal in the spare tire compartment, which may be a source of significant noise in the vehicle. Accordingly, the bead 172 prevents lateral travel of noise, thereby isolating spare tire compartment noise.

Figure 18:
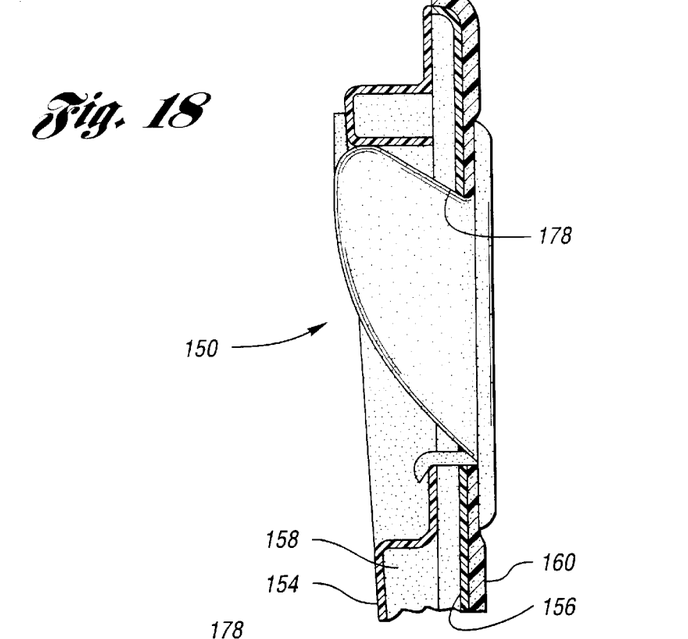
FIG. 18 is a cross-sectional view of the load floor of FIG. 16 taken at line 18—18.
Figure 19:
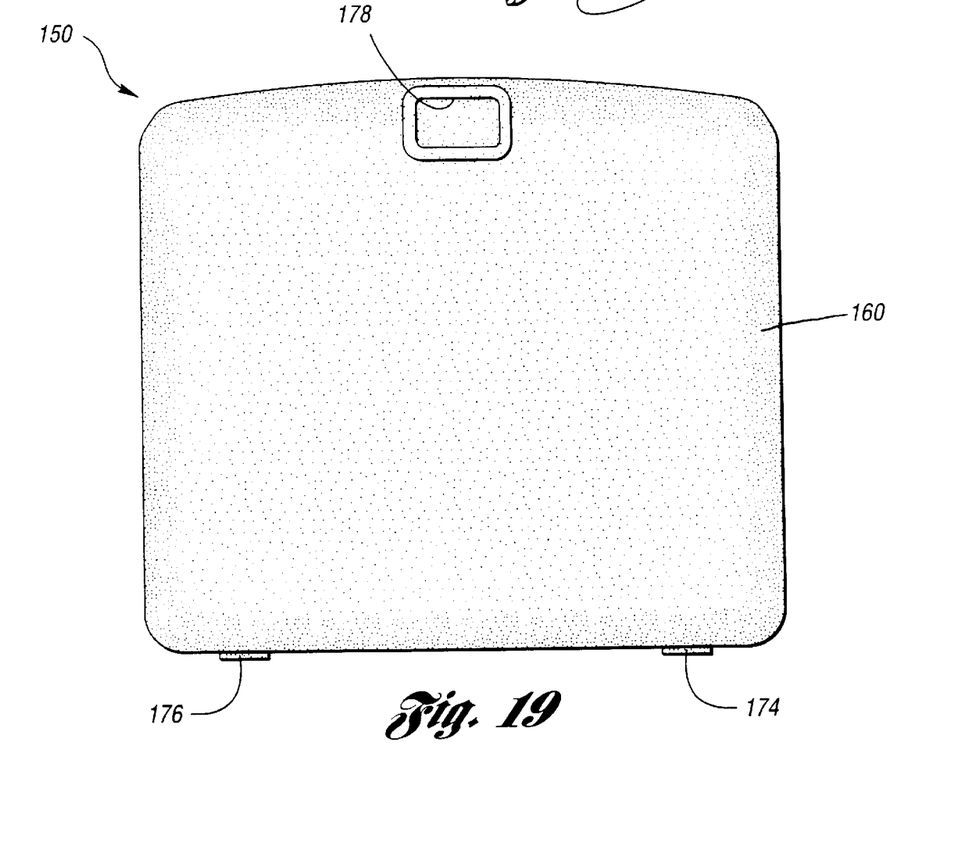
FIG. 19 is a reverse side plan view of the load floor of FIG. 16.

The load floor 150 is formed with hinges 174,176, as well as a handle 178, as shown in FIGS. 18 and 19, for functionality. Locking features are preferably provided in the attachment areas 182,184, shown in FIG. 16, for attachment in the vehicle. Preferably, a locking feature similar to Velcro® is used, such as a densely packed population of buttons or mushroom-shaped components which lock into similar adjacent components on the vehicle body.

Preferably, the carpet 160 is backingless to allow significant penetration of the plastic wall 156, while molten, into the carpet 164 for integral bonding.

The vehicle load floor 150 described above with reference to FIGS. 16–19 is formed by the process previously described, comprising: a) positioning a carpet between a pair of mold halves, one of the mold halves having at least one needle hole; b) introducing a hollow plastic tube between the mold halves; c) bringing the mold halves toward each other, wherein the mold halves are configured to form a vehicle load floor having an internal cavity with a plurality of spaced radially extending support ribs and spaced, curved support portions extending circumferentially; and d) blowing fluid through the needle hole to force the plastic against the mold and the carpet. Preferably, the step of introducing a molten plastic tube comprises extruding a molten plastic tube having approximately 30% fiberglass. Also, preferably, air is circulated through the internal cavity 158 for cooling. In a preferred embodiment, seven needle holes are provided, and air is circulated into the cavity 158 through five of the seven needle holes, and exits through two of the seven needle holes.

It should be understood that while the forms of the invention shown and described above constitute preferred embodiments of the invention, they are not intended to illustrate all possible forms thereof. For instance, a continuous extrusion blow molding process could be adapted for use with the present invention. It should also be understood that the words used are words of description rather than limitation, and various changes may be made without departing from the spirit and scope of the invention disclosed.

What is claimed is:

1. A method of forming a carpeted load floor for a vehicle comprising:

positioning a carpet between a pair of mold halves, one of the mold halves having at least one needle hole;

introducing a hollow molten plastic tube between the mold halves;

bringing the mold halves toward each other, wherein the mold halves are configured to form a vehicle load floor having an internal cavity with a plurality of spaced radially extending support ribs and spaced, curved support portions extending circumferentially; and blowing fluid through the needle hole to force the plastic against the mold and the carpet.

2. The method of claim 1, wherein said step of introducing a molten plastic tube comprises extruding a molten plastic tube having approximately 30% fiberglass.

3. The method of claim 1, further comprising circulating air through the internal cavity for cooling.

* * * * *